United States Patent
Watson et al.

(10) Patent No.: US 9,315,332 B2
(45) Date of Patent: Apr. 19, 2016

(54) INTRODUCTION OR WITHDRAWAL OF AN ELONGATE MEMBER TO OR FROM A FREE BODY

(71) Applicant: BAE SYSTEMS plc, London (GB)

(72) Inventors: Tobias Jonathan Watson, Glasgow-Lanarkshire (GB); Leigh Francis Heaton, Glasgow-Lanarkshire (GB); Fraser Angus Bain, Glasgow-Lanarkshire (GB); Steven Martin Fraser, Glasgow-Lanarkshire (GB); Graham David Blair, Glasgow-Lanarkshire (GB); Boyd Halley, Glasgow-Lanarkshire (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 14/353,879

(22) PCT Filed: Oct. 19, 2012

(86) PCT No.: PCT/GB2012/052590
§ 371 (c)(1),
(2) Date: Apr. 24, 2014

(87) PCT Pub. No.: WO2013/061034
PCT Pub. Date: May 2, 2013

(65) Prior Publication Data
US 2014/0332349 A1    Nov. 13, 2014

(30) Foreign Application Priority Data
Oct. 25, 2011    (GB) .................................. 1118378.7

(51) Int. Cl.
*B65G 35/00*    (2006.01)
*B65G 9/00*    (2006.01)
(Continued)

(52) U.S. Cl.
CPC . *B65G 35/00* (2013.01); *B63B 9/00* (2013.01); *B63G 3/00* (2013.01); *B63H 23/34* (2013.01)

(58) Field of Classification Search
None
See application file for complete search history.

(56) References Cited

U.S. PATENT DOCUMENTS

| | | | |
|---|---|---|---|
| 2,896,909 | A | 7/1959 | Taylor |
| 2,940,769 | A | 6/1960 | Taylor |

(Continued)

FOREIGN PATENT DOCUMENTS

| | | |
|---|---|---|
| DE | 3704343 A1 | 8/1988 |
| GB | 2103540 A | 2/1983 |

(Continued)

OTHER PUBLICATIONS

International Preliminary Report on Patentability and Written Opinon received for Patent Application No. PCT/GB2012/052590, mailed on May 8, 2014, 7 pages.

(Continued)

*Primary Examiner* — Kavel Singh
(74) *Attorney, Agent, or Firm* — Finch & Maloney PLLC

(57) ABSTRACT

A method of moving an elongate member (12) along a predetermined axis (A-A) for the introduction or withdrawal thereof to or from a free body (11). The method includes providing an elongate guide surface (18) extending parallel to the predetermined axis, and also providing a plurality of support elements (26) which are slidable on the support surface in a direction parallel to the predetermined axis. The elongate member is supported on the support elements so that at least a major portion of the mass is supported. The elongate member and the support elements are moved along the predetermined axis. Apparatus for moving an elongate member in this manner is also provided.

18 Claims, 3 Drawing Sheets

(51) Int. Cl.
  *B65G 3/00* (2006.01)
  *B63H 23/34* (2006.01)
  *B63B 9/00* (2006.01)
  *B63G 3/00* (2006.01)

(56) References Cited

U.S. PATENT DOCUMENTS

| | | | | |
|---|---|---|---|---|
| 4,139,035 A * | 2/1979 | Bystedt | ............... | B27B 31/06 |
| | | | | 144/215.2 |
| 4,544,322 A | 10/1985 | Booker | | |
| 4,692,087 A | 9/1987 | Olsen | | |
| 4,739,691 A | 4/1988 | Beutler et al. | | |
| 6,602,037 B2 * | 8/2003 | Winkler | ............... | B65G 1/023 |
| | | | | 414/273 |

FOREIGN PATENT DOCUMENTS

| | | | |
|---|---|---|---|
| GB | 2151190 A * | 7/1985 | |
| JP | 06312685 A | 11/1994 | |
| SU | 540765 A1 | 1/1977 | |
| SU | 640903 A2 | 1/1979 | |
| SU | 1047767 A2 | 10/1983 | |
| SU | 1134459 A1 | 1/1985 | |
| WO | 9104905 | 4/1991 | |
| WO | 2013061034 A1 | 5/2013 | |

OTHER PUBLICATIONS

International Search Report received for Patent Application No. PCT/GB2012/052590, mailed on Feb. 18, 2013, 4 pages.

GB Intellectual Property Office Search Report under Section 17(5) received for GB Patent Application No. 1118378.7 mailed Feb. 16, 2012, 4 pages.

GB Intellectual Property Office Combined Search and Examination Report under Sections 17 and 18(3) received for GB Patent Application No. 1218798.5 mailed Feb. 15, 2013, 7 pages.

* cited by examiner

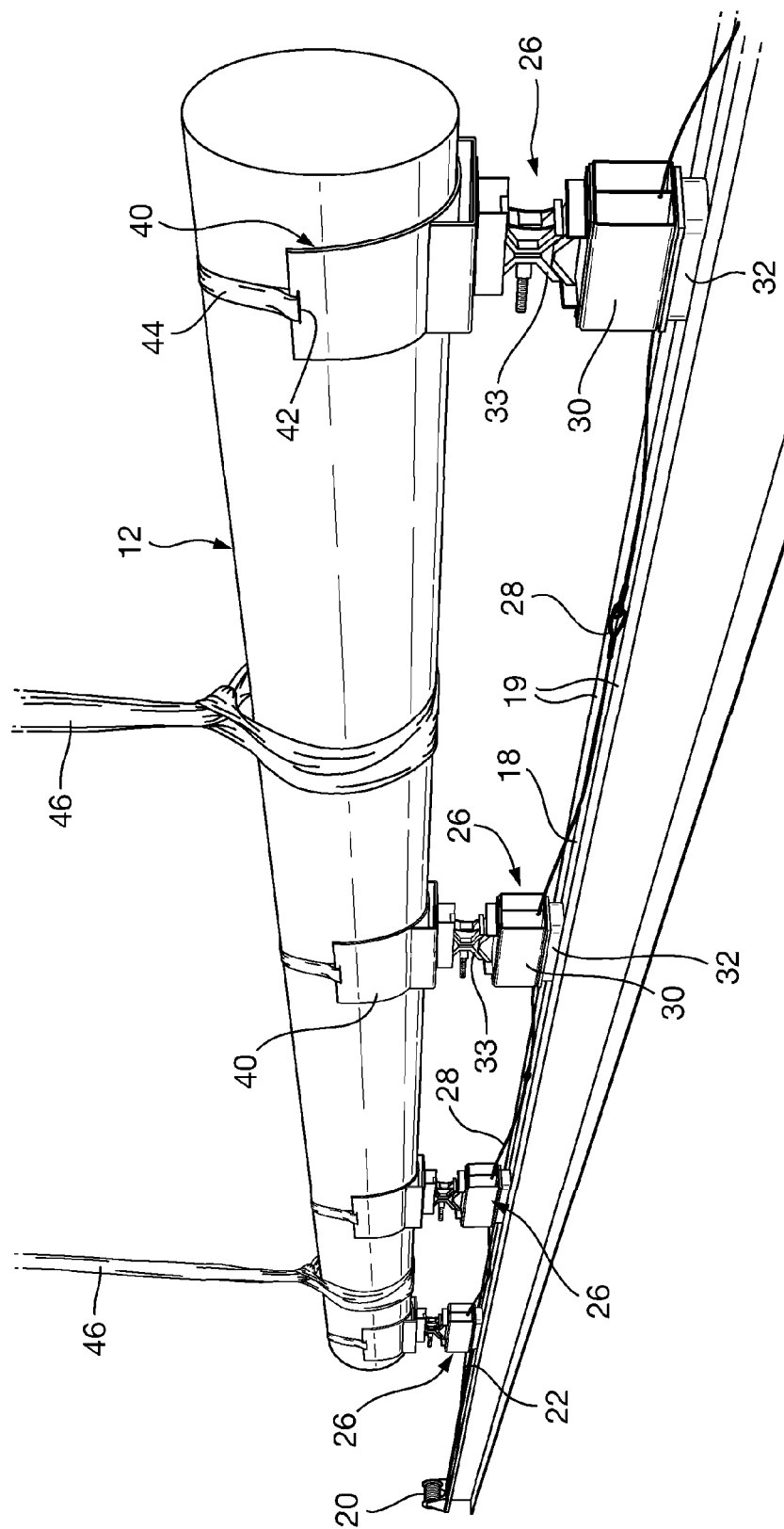

INTRODUCTION OR WITHDRAWAL OF AN ELONGATE MEMBER TO OR FROM A FREE BODY

This invention relates to the introduction or withdrawal of an elongate member to or from a free body. In particular, but not exclusively, the invention is concerned with moving a shaft into/out of an enclosed space, where the shaft has to be inserted along its longitudinal axis and traversed across bearings along the route, such as the introduction or withdrawal of a propeller shaft to or from a naval vessel.

Conventionally, when building large naval vessels such as the Queen Elizabeth, the propeller shaft is manoeuvred into position towards and through one or more bracket barrels by "chaining in", whereby the shaft is manoeuvred inch by inch whilst it is supported by cables slung from eyepads on the nearby surface of the ship's hull. To give an idea of scale, a typical ship's propeller shaft section will be 1 meter in diameter, 20 meters in length, and weigh approximately 40 tonnes. To chain in such a shaft is extremely labour-intensive and relies on chain blocking and manual weight transfer. Unlike most shore applications, where the shafting would be simply be craned into place from above, this approach is not possible with the ship because the installation of the shaft involves a complicated alignment process that is principally dependent on the completeness of the surrounding structure for its "foundation". In fact, the alignment process begins with the locating of the outboard bearings and before the shaft is installed, but it requires the hull form to be substantially complete.

In addition to requiring large amounts of manpower and taking a long time, there is also a risk of damage to the shaft as it is chained in, due to damage caused by the chain and/or misalignment of the shaft with associated bearing or support surfaces. Further, there are also health and safety risks associated with this conventional approach because the operatives are working close up to the shafting. If the shafting should suddenly lurch or drop then there is a significant risk of an operative getting trapped or injured.

It will be appreciated that there are other situations where space/location restrictions mean that no overhead lift for installing an elongate shaft, pipe or the like is possible; for example, when working in a cavern in the side of a hill, or specialist applications in the oil/gas, power generation and water industries.

We have therefore designed a method and apparatus which allows controlled sliding movement of the shaft along the installation axis and which can reduce the amount of chain blocking, manual weight transfer and the number of people required to be involved.

In one aspect, this invention provides a method of moving an elongate member along a predetermined axis for the introduction or withdrawal thereof to or from a free body, which method comprises the steps of:
  providing an elongate guide surface extending parallel to said predetermined axis;
  providing a plurality of support elements which are slideable on said support surface in a direction parallel to said predetermined axis;
  supporting said elongate member on said support elements so that at least a major portion of the mass is supported thereby, and
  causing said elongate member and said support elements to move along said predetermined axis.

In this way the majority of the mass of the elongate member is supported on the support elements which may be slid along the guide surface so as to give continuous linear movement of the elongate member.

Said elongate guide surface preferably comprises a straight load-supporting surface, and said support elements each comprise one or more load-supporting pads that engage and are slideable along said load-supporting surface.

Each load-supporting pad is conveniently made of low friction material, such as e.g. polytetrafluoroethylene (PTFE). The support elements are preferably constrained against transverse movement with respect to said load-supporting surface by suitable means, for example by spaced generally parallel side elements upstanding from opposite edges of said load-supporting surface, although other constraints may be used.

Preferably the effective height of the support elements is adjustable. Preferably said support elements are interconnected by tie elements to transmit a drive load there between. The tie elements are conveniently flexible.

Each support element preferably comprises a cradle portion upwardly open to receive and engage a portion of the elongate member when lowered in use. It is preferred for the support elements to be dismantleable into parts whereby, when the elongate member is supported by a series of three or more support elements, one of said support elements of the series may be dismantled and removed to leave the elongate member still supported in alignment with said predetermined axis by the remaining support elements.

Although the method may be used to introduce or withdraw the elongate member to or from a bore which supports and encloses the adjacent portion of the elongate member, it is particularly useful for situations where a elongate member needs to be passed through and beyond a structural member, such as a propeller shaft bracket boss (or an "A bracket barrel"). Thus, where an end of the elongate member is caused to move towards and beyond an associated structural member in use the method may conveniently comprise:
  causing said elongate member and said at least three support elements to move in the direction of said associated structural member until said one end of the elongate member is adjacent said associated structural member,
  dismantling said leading support element leaving the elongate member supported at least partially by the remaining elements, and
  causing further movement of said elongate member beyond said associated structural member. In some such cases part of the load may be supported by the associated structural member after dismantling of said leading support element.

Where the elongate member needs to be supported to the other side of the support bracket, the said elongate guide surface provided may extend beyond said associated structural member, and the method may further include the steps of:
  reassembling said leading support element at a location beyond said associated structural member,
  continuing movement of said elongate member until the next support element in the series approaches said associated structural member,
  dismantling said next support element, and
  further moving said elongate member, and
  optionally repeating said moving, dismantling, moving and reassembling steps until the required support elements have been reassembled beyond said associated structural member.

The elongate member may comprise a propeller shaft and the free member may comprise a waterborne vessel, or at least the stern portion of a waterborne vessel. The waterborne vessel may in particular be a naval vessel, and the invention extends to a method of constructing a naval vessel comprising applying the above method.

The invention extends to apparatus for use in the method. Thus, in another aspect, the invention provides apparatus for moving an elongate member along a predetermined axis for the introduction or withdrawal thereof to or from a free body, which comprises:

- an elongate guide surface extending parallel to said predetermined axis;
- a plurality of support elements which are slidable on said guide surface in a direction parallel to said predetermined axis;
- said support elements being adapted to receive and support at least a major portion of the mass of said elongate member, and
- a drive for causing said elongate member and said support elements to move along said predetermined axis.

Whilst the invention has been described above, it extends to any inventive combination of features set out above in the following description, claims or drawings.

By way of example only, one specific embodiment of the invention will now be described by reference to the accompanying drawings, in which:

FIG. 2 is a view of a system for slideably supporting a propeller shaft for movement along an installation axis;

Figure 1:
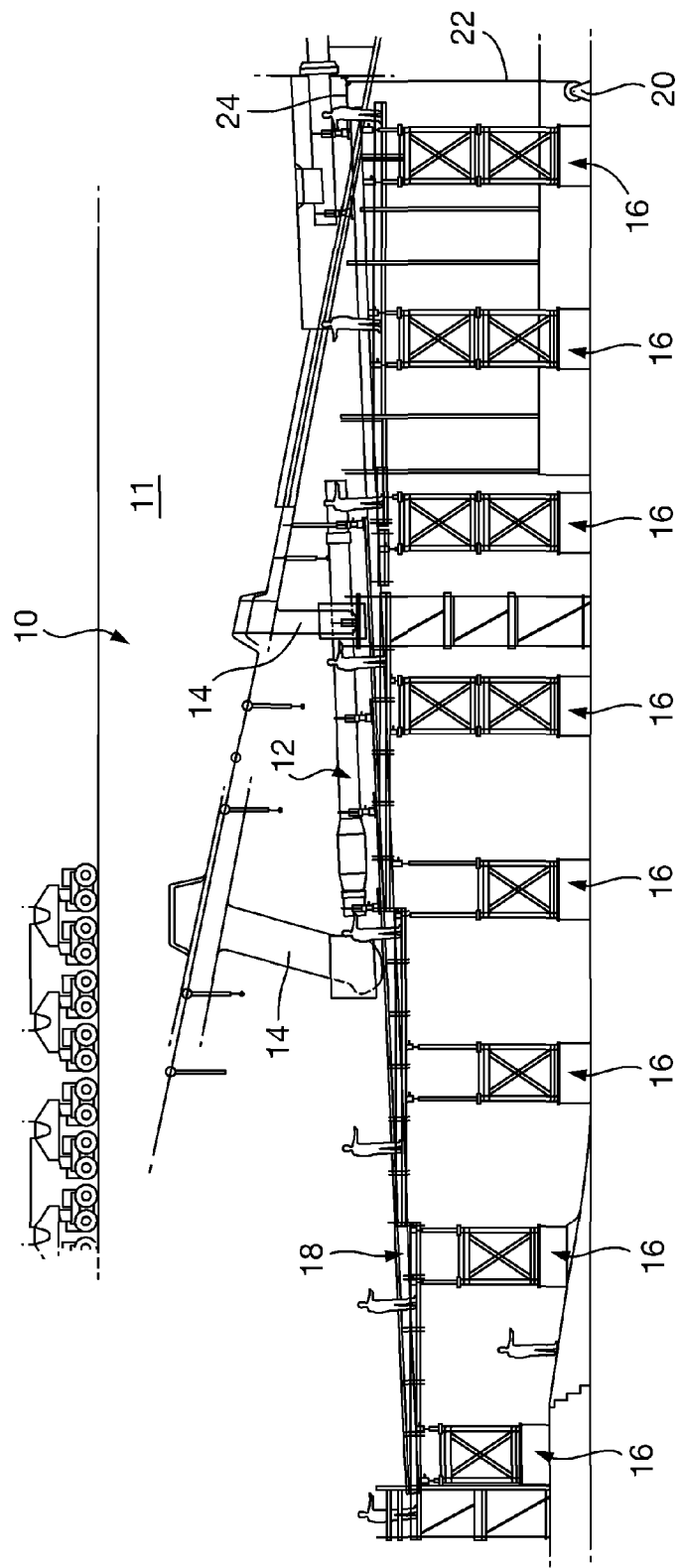
FIG. 1 is a side view of the aft end of a naval vessel into which a propeller shaft is to be installed.

Referring initially to FIG. 1, there is shown the stern portion 10 of a naval vessel 11 in which an elongate (i.e. the length of the shaft is greater than the span of the bearings (described below) provided for it) propeller shaft 12 is required to be aligned with an axis A-A, a few degrees below horizontal, and inserted along this axis. The shaft will normally be a single component, but in some cases can be formed of several components fixed together. The shaft passes through two "A" bracket barrels 14 aft of its emergence from the hull. An "A" bracket is a bracket that is attached to the side of the vessel and is so called because it is shaped like the letter "A", with the shaft running through a bearing that is placed inside a bearing boss (commonly known as a "barrel" in ship building because of its similarity in shape) located at the apex of the "A". In order to install the shaft, a platform structure is built comprising a number of support towers 16 which support a straight guide surface 18 parallel to, but spaced by a set distance from, the shaft centre line or installation axis A-A. The guide surface 18 and associated structure will be described in further detail in relation to the following figures. A cable winch 20 is disposed on the ground at the forward end of the platform structure with the cable 22 passing over a pulley 24 to then pass to the structure as to be described below.

Figure 3A:
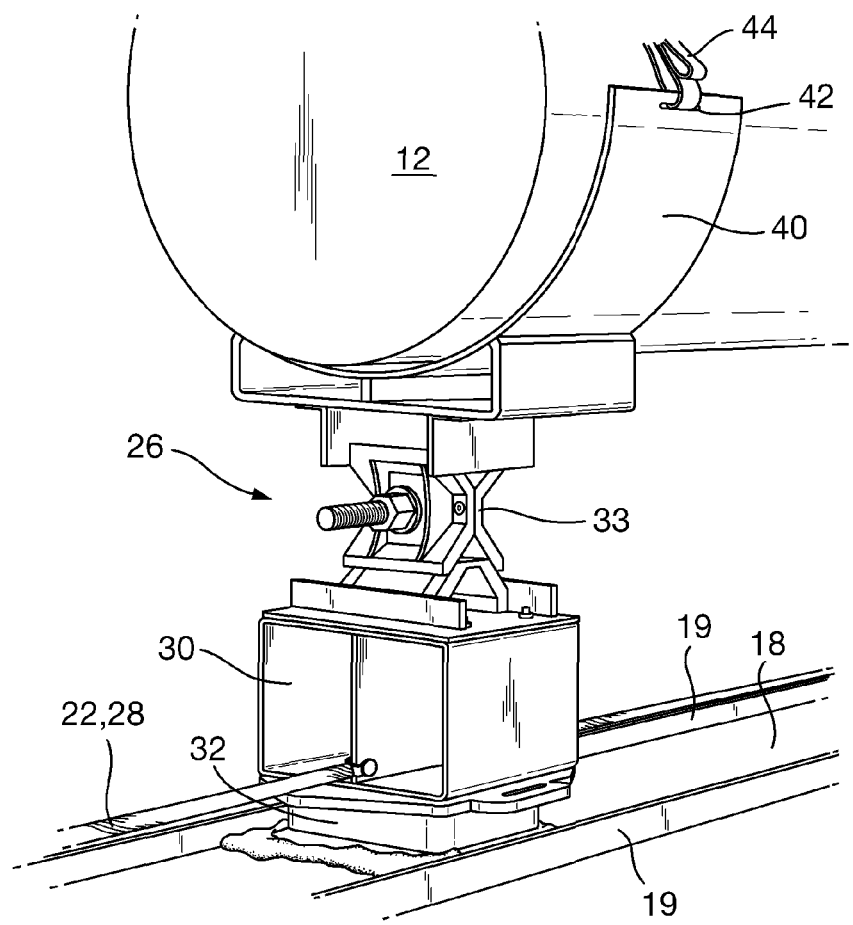
FIG. 3(a) is a detailed view of a cradle when assembled.
Figure 3B:
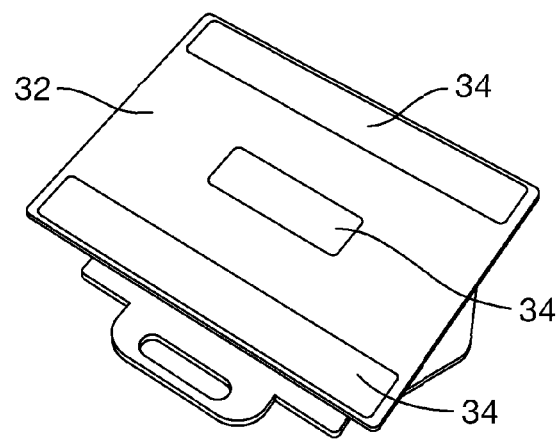
FIG. 3(b) is a detailed view on the underside of the foot of a cradle.

Referring now to FIGS. 2, 3(a) and 3(b), the installation system comprises the guide surface 18 on which can slide a number of cradles 26, of which four are illustrated. The cradles 26 are interconnected by tie cables 28 with the forwardmost cradle being connected to the winch cable 22. As best seen in FIGS. 3(a) and (b), each cradle 26 has a lower portion 30 of rectangular form connected to a foot 32, on the underside of which are provided one or more (three in the example) load supporting, low-friction pads 34 (e.g. of PTFE). The guide surface 18 is provided with upstanding lateral constraint edges 19 which ensure that the cradle is constrained to move in the direction parallel to the installation axis. The upper part of the cradle 26 is provided with a dismantlable, rigid height adjustable wedge jack 33 which connects the box section 30 to a semi-circular cradle portion 40 designed to receive the shaft when lowered into it. The cradle portion has slots 42 or other suitable attachment means to allow a strap 44 to be applied in order to strap the shaft into the cradle. The wedge jacks may be eg Titan™ wedge jacks.

In addition to the cradles, the shaft may be supported by top steadies 46 (see FIG. 2), e.g. of webbing. The top steadies function as a safety harness and are intended to receive the load quickly and safely if there is a failure in the mechanism. In this arrangement, the majority of the mass of the shaft is supported by the cradles. In use, the shaft may be drawn along the installation direction by operating the winch 20 which moves cradles (four in the example) 26 and the supported shaft 12, via the winch cable 22 and the tie cables 28. The shaft 12 may be passed through the "A" bracket barrels 14 by moving the shaft and the cradle assemblies 26 towards the first "A" bracket barrel 14. As the first cradle assembly 26 approaches the first "A" bracket barrel 14, the associated wedge jacks 33 can be adjusted upwards or downwards to ensure alignment between the shaft and the bracket barrel. The jack and the box section 30 must then be removed to allow the shaft to pass through the bracket barrel. When a cradle assembly approaches, and is close to contact, the Titan™ jack is lowered to take that cradle assembly off load. The jack and the box section can then be unbolted and removed. This will allow the shaft—with semi circular cradle 40 still attached—to pass through the bracket barrel unhindered when the winch 20 is used. When the shaft emerges from the bracket barrel, the procedure is reversed and the jack and the box section are reassembled to support the shaft and the winch 20 is applied again and the process repeated for each of the successive cradles.

It will be appreciated that the apparatus and method described above can be adapted to install and/or remove other types of elongate members, such as pipes in height-restricted locations.

The invention claimed is:

1. A method of moving an elongate member along a predetermined axis for the introduction or withdrawal thereof to or from a free body, the method including:
   - providing an elongate guide surface extending parallel to said predetermined axis;
   - providing a plurality of support elements which are slidable on said elongate guide surface in a direction parallel to said predetermined axis;
   - supporting said elongate member on said support elements so that at least a major portion of the mass is supported thereby; and
   - causing said elongate member and said support elements to move along said predetermined axis;
   - wherein the support elements are dismantleable whereby, when the elongate member is supported by a series of three or more said supporting elements, one of said supporting elements of the series can be dismantled to leave the elongate member supported in alignment with said predetermined axis by the remaining support elements,
   - wherein said elongate member comprises a propeller shaft for propelling a naval vessel, and
   - wherein said free body comprises at least a stern portion of the naval vessel.

2. A method according to claim 1, wherein said elongate guide surface comprises a flat planar load-supporting surface, and said support elements each comprise at least one load-supporting pad that, in use, engage and are slidable along said load-supporting surface.

3. A method according to claim 2, wherein each said support element comprises a plurality of said load-supporting pads, and wherein each said load-supporting pads is of low friction material.

4. A method according to claim 2, wherein said support elements are constrained against transverse movement with respect to said load-supporting surface by spaced generally parallel side elements upstanding from opposite edges of said load-supporting surface.

5. A method according to claim 1, wherein said support elements are interconnected by flexible tie elements.

6. A method according to claim 1, wherein each said support element comprises a cradle portion upwardly open to receive and engage a portion of the elongate member when said elongate member is lowered in use.

7. A method according to claim 1, wherein an end of the elongate member is caused to move towards and beyond an associated structural member, and wherein the method further comprises:
   causing said elongate member to move in the direction of said associated structural member until said one end is adjacent to said associated structural member;
   dismantling a leading said support element, leaving the elongate member supported by remaining said support elements; and
   causing further movement of said elongate member beyond said associated structural member.

8. A method according to claim 7, wherein said elongate guide surface extends beyond said associated structural member and the method further includes:
   reassembling said leading support element at a location beyond said associated structural member;
   continuing movement of said elongate member until a next said support element approaches said associated structural member;
   dismantling said next support element;
   further moving said elongate member; and
   optionally, repeating said moving, dismantling, moving and reassembling until a preset number of said supporting elements have been reassembled beyond said associated structural member.

9. A method of constructing a naval vessel comprising applying the method of claim 1.

10. A method of moving an elongate member along a predetermined axis for the introduction or withdrawal thereof to or from a free body, the method including:
   providing an elongate guide surface extending parallel to said predetermined axis;
   providing a plurality of support elements which are slidable on said elongate guide surface in a direction parallel to said predetermined axis;
   supporting said elongate member on said support elements so that at least a major portion of the mass is supported thereby; and
   causing said elongate member and said support elements to move along said predetermined axis;
   wherein the support elements are dismantleable whereby, when the elongate member is supported by a series of three or more said supporting elements, one of said supporting elements of the series can be dismantled to leave the elongate member supported in alignment with said predetermined axis by the remaining support elements,
   wherein an end of the elongate member is caused to move towards and beyond an associated structural member, and wherein the method further comprises:
      causing said elongate member to move in the direction of said associated structural member until said one end is adjacent to said associated structural member;
      dismantling a leading said support element, leaving the elongate member supported by remaining said support elements; and
      causing further movement of said elongate member beyond said associated structural member.

11. A method according to claim 10, wherein said elongate guide surface comprises a flat planar load-supporting surface, and said support elements each comprise at least one load-supporting pad that, in use, engage and are slidable along said load-supporting surface.

12. A method according to claim 11, wherein each said support element comprises a plurality of said load-supporting pads, and wherein each said load-supporting pads is of low friction material.

13. A method according to claim 11, wherein said support elements are constrained against transverse movement with respect to said load-supporting surface by spaced generally parallel side elements upstanding from opposite edges of said load-supporting surface.

14. A method according to claim 10, wherein said support elements are interconnected by flexible tie elements.

15. A method according to claim 10, wherein each said support element comprises a cradle portion upwardly open to receive and engage a portion of the elongate member when said elongate member is lowered in use.

16. A method according to claim 10, wherein said elongate guide surface extends beyond said associated structural member and the method further includes:
   reassembling said leading support element at a location beyond said associated structural member;
   continuing movement of said elongate member until a next said support element approaches said associated structural member;
   dismantling said next support element;
   further moving said elongate member; and
   optionally, repeating said moving, dismantling, moving and reassembling until a preset number of said supporting elements have been reassembled beyond said associated structural member.

17. A method according to claim 10, wherein said elongate member comprises a propeller shaft for a naval vessel, and wherein said free body comprises a naval vessel, or at least the stern portion of a naval vessel.

18. A method of constructing a naval vessel comprising applying the method of claim 17.

* * * * *